United States Patent
Sánchez-Brunete Álvarez

(10) Patent No.: US 8,146,865 B2
(45) Date of Patent: Apr. 3, 2012

(54) LEADING EDGE FOR AIRCRAFT MADE OF REINFORCED COMPOSITE MATERIAL

(75) Inventor: Desiderio Sánchez-Brunete Álvarez, Madrid (ES)

(73) Assignee: Airbus Espania S.L, Madrid (ES)

( * ) Notice: Subject to any disclaimer, the term of this patent is extended or adjusted under 35 U.S.C. 154(b) by 244 days.

(21) Appl. No.: 11/807,903

(22) Filed: May 30, 2007

(65) Prior Publication Data

US 2008/0258009 A1    Oct. 23, 2008

(30) Foreign Application Priority Data

Mar. 30, 2007    (ES) .................................. 200700852

(51) Int. Cl.
*B64D 1/00*    (2006.01)
(52) U.S. Cl. ..................... 244/133; 244/123.1; 244/130; 244/134 D
(58) Field of Classification Search .................. 244/219, 244/123.1, 46, 99.8, 200, 200.1, 201, 130, 244/134 D, 121; 428/135, 136
See application file for complete search history.

(56) References Cited

U.S. PATENT DOCUMENTS

| | | | | |
|---|---|---|---|---|
| 2,205,543 A | * | 6/1940 | Rideau et al. | 244/134 D |
| 2,371,754 A | * | 3/1945 | Gillum et al. | 428/594 |
| 3,135,486 A | * | 6/1964 | Wing | 244/123.8 |
| 3,762,835 A | * | 10/1973 | Carlson et al. | 416/224 |
| 5,031,862 A | * | 7/1991 | Rhodes | 244/121 |
| 5,449,273 A | * | 9/1995 | Hertel et al. | 416/224 |
| 5,508,496 A | * | 4/1996 | Hansen et al. | 219/633 |
| 5,723,807 A | * | 3/1998 | Kuhn, II | 89/36.02 |
| 5,747,721 A | * | 5/1998 | Speakes et al. | 89/36.11 |
| 5,916,469 A | * | 6/1999 | Scoles et al. | 219/633 |
| 6,286,785 B1 | * | 9/2001 | Kitchen | 244/121 |
| 7,195,210 B2 | * | 3/2007 | Hamilton et al. | 244/219 |
| 2004/0145080 A1 | * | 7/2004 | Tanaka | 264/257 |

* cited by examiner

*Primary Examiner* — Tien Dinh
*Assistant Examiner* — Justin Benedik
(74) *Attorney, Agent, or Firm* — Ladas & Parry LLP

(57) ABSTRACT

The present invention relates to a leading edge (1) for aircraft made of composite material, characterized in that it comprises on its inner face a metallic-type reinforcement (2) firmly adhered to the mentioned inner face of the leading edge (1) arranged such that it confers the leading edge (1) with better capacity to adapt to deformability and greater absorption of energy due to impacts. The invention also relates to a method of manufacturing a leading edge (1) with a metallic reinforcement (2) for aircraft made of composite material.

11 Claims, 1 Drawing Sheet

LEADING EDGE FOR AIRCRAFT MADE OF REINFORCED COMPOSITE MATERIAL

FIELD OF THE INVENTION

The present invention relates to a leading edge for aircraft made of reinforced composite material, as well as to a method of manufacturing the same.

BACKGROUND OF THE INVENTION

The material most commonly used for leading edges for reinforced aircraft is Glare, a metallic laminate of fiberglass-reinforced fibers made up of several thin layers of metal, usually aluminum, placed between preimpregnated layers of fiberglass, joined by means of an epoxy-type resin. The unidirectional preimpregnated layers can be aligned in different directions to meet the required reinforcement conditions.

Glare belongs to metallic aerospace materials; it is not a composite material. Therefore the application and manufacture of Glare is very close to that of aluminum, having very little in common with composite material structures in terms of design, manufacture, inspection and maintenance.

In modern aircraft, the cost of implementing Glare is very high while at the same time its capacity to adapt to the deformability requirement and its capacity to absorb energy coming from impacts are extremely complex.

The present invention is therefore aimed at solving these drawbacks for the case of leading edges for aircraft made of reinforced composite material.

SUMMARY OF THE INVENTION

The present invention therefore proposes in a first aspect a leading edge for aircraft made of a composite material on the inside of the skin to which there is fixed a metallic type reinforcement, such that the cost of implementing this material and of reinforcing it is much less than that of Glare, while at the same time it has a better capacity to adapt to deformability and a greater absorption of energy due to impacts, typically due to bird impacts.

Therefore the leading edges made of a composite material according to the invention have high inertia before deformation due to a certain impact, while at the same time they facilitate distribution of the impact load on a larger surface than the impacted surface, said leading edges further being easily configured in thickness and distribution, providing the metallic-type reinforcement of the mentioned leading edges with an extra component for resistance against the impact providing progressive resistance to deformation.

According to a second aspect of the invention, a method of manufacturing a reinforced leading edge for aircraft made of a composite material is proposed.

Other features and advantages of the present invention will be deduced from the following detailed description of an illustrative embodiment of its object in relation to the attached figures.

DETAILED DESCRIPTION OF THE INVENTION

Figure 1:
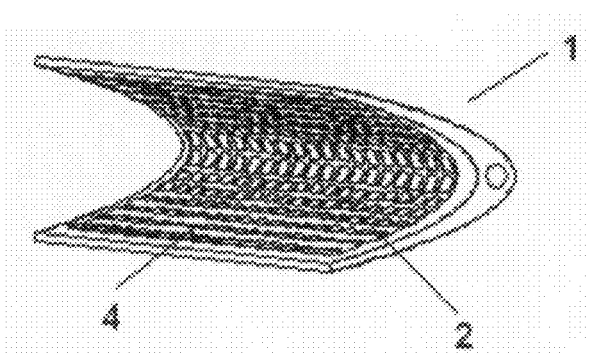
FIG. 1 shows a leading edge for aircraft made of composite material with a grating-type metallic reinforcement according to the invention.
Figure 2:
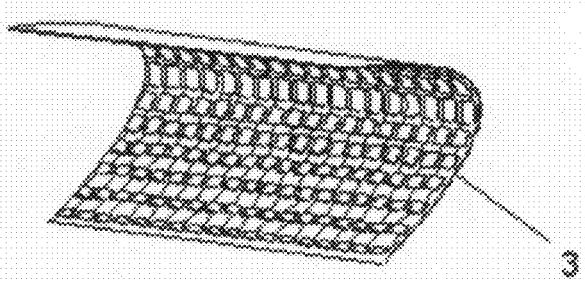
FIG. 2 shows a template for obtaining a leading edge for aircraft made of reinforced composite material according to the invention.
Figure 3:
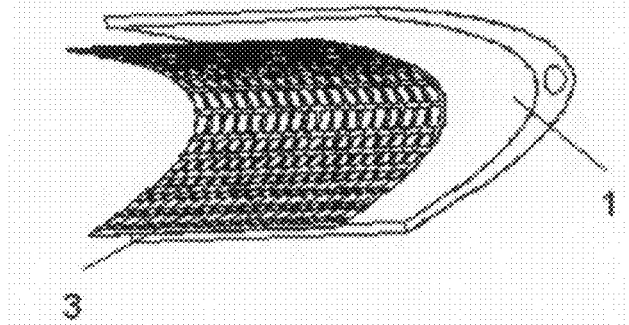
FIG. 3 shows the positioning of the template on the leading edge made of composite material to be reinforced according to the invention.
Figure 4:
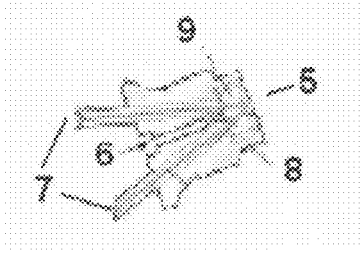
FIG. 4 schematically shows a nozzle used in the process of obtaining a leading edge for aircraft made of composite material according to the invention.

The present invention therefore provides a leading edge 1 for aircraft made of composite material on the inside of the skin to which there is fixed a metallic-type reinforcement 2, such that the leading edge 1 obtained has better capacity to adapt to deformability and greater absorption of energy due to impacts, typically due to bird impacts.

The object of the invention consists of fixing on the inside of the leading edge 1 a metallic-type reinforcement 2, preferably grating, such that it confers the reinforced leading edge 1 with the following properties and advantages:

- the cost of implementing this material and the cost of its reinforcement is much less than that of Glare;
- it has better capacity to adapt to deformability due to impacts;
- it has greater absorption of energy due to impacts;
- it facilitates the distribution of the impact load on a larger surface than the impacted surface, such that it is not only the point of the impact that will suffer due to the effect thereof, but rather it is distributed on most of the surface;
- the adhered metallic grating can be easily configured in thickness and distribution;
- it provides an extra component for resistance against impact provided by progressive resistance to deformation.

This solution is carried out by means of a surface metallization process referred to as metal spraying, the technology and installations of which are used for the superficial protection of several types of surfaces. This process consists of melting preferably by means of an electric arc 8 a rod 7 of aluminum or another material, within an intense flow of inert gas 6, which generates a fine spray of melted metal expelled by a nozzle 9 which firmly adheres to the surface in question. The previous metal spraying process is a process of coating surfaces by means of which coating materials in fine metallic or non-metallic, melting or semi-melted particles are sprayed on a prepared substrate material.

The coating material can be provided in a rod 7, in powder, in a rope or cable with a center strand. The thermal spray equipment generates the necessary heat together with a combination of gases and an electric arc 8. When the coating material particles are melted, they are sprayed at such a speed that they form a flow 5 of spray on the substrate material to be treated. When the particles reach the substrate material, they form a series of planar layers which combine to form a laminar structure.

The flow 5 of melted material solidifies on the surface of the component to form a dense coating strongly adhered thereto.

One of the main advantages of this process is that the coatings can be used almost instantly without curing or drying times, there being no risk of damaging the component. The coatings further have a high level of fixing to the substrate material while at the same time the use of only compressed air 6 and electricity makes the coatings more cost-effective.

By placing a template 3 in the path of the spray, this template preferably being disposable after each use, a grating with variable thickness can be obtained after several layers with different templates 3, the thickness being greater the farther the nose is from the leading edge, or the square size of the grating 4 being variable, for example being smaller the farther the nose is from the leading edge, for the purpose of obtaining ease in the deformation of the leading edge, involving the largest surface possible in absorbing energy, and therefore, less probability of breaking.

It is likewise possible to metallize using the metal spraying process on an autonomous template 3 made of a soluble material, such that once the metallic grating 2 is obtained, the mentioned grating 2 can be implemented in parts on the inside of the leading edge 1 so as to reinforce it.

The template 3 must be able to be handled for its placement, use and removal, so it is preferably built of a thin sheet metal material.

According to a second aspect of the invention, a method of manufacturing a leading edge 1 with a metallic reinforcement 2 for aircraft made of composite material is proposed, comprising the following steps:

a) preparing a template 3 with the stencil plate of the reinforcement or grating 2 to be positioned against the inside on the leading edge 1;
b) positioning the template 3 on the inside of the leading edge 1 to be reinforced;
c) spraying by means of metal spraying a fine spray of melted metal on the template 3 located inside the leading edge 1 to be reinforced;
d) solidifying the melted material on the surface of the leading edge 1 to form a dense coating strongly adhered thereto;
e) removing the template 3 from the leading edge 1.

Any modifications comprised within the scope defined by the following claims can be introduced in the preferred embodiment described above.

The invention claimed is:

1. An aircraft skin part having a leading edge made of composite material, said part having an inner face which part comprises on its inner face a metallic-type reinforcement directly and firmly adhered to the said inner face of the leading edge by having been sprayed thereon said reinforcement being arranged such that it confers the leading edge with better capacity to adapt to deformability and greater absorption of energy due to impacts.

2. A part having a leading edge for aircraft made of composite material according to claim 1, wherein the metallic reinforcement has a grating shape.

3. A part having a leading edge for aircraft made of composite material according to claim 1, wherein the reinforcement is made of aluminum.

4. A part having a leading edge for aircraft made of composite material according to claim 1, wherein the reinforcement has variable thickness.

5. A part having a leading edge for aircraft made of composite material according to claim 4, wherein the thickness of the reinforcement is greater farther from the leading edge.

6. A part having a leading edge for aircraft made of composite material according to claim 2, wherein the size of the metallic grating is variable.

7. A part having a leading edge or aircraft made of composite material according to claim 6, wherein the size of the metallic grating is smaller the farther from the leading edge for the purpose of facilitating deformation of the leading edge and involving the largest possible surface in absorbing energy after an impact.

8. An aircraft skin part having a leading edge made of composite material, said part having an inner face, said inner face having had having sprayed directly thereon and having adherent thereto a metallic reinforcing grating.

9. An aircraft skin part according to claim 8, wherein the reinforcing grating is made of aluminum.

10. An aircraft skin part according to claim 8, wherein the reinforcing grating has variable thickness.

11. An aircraft skin part according to claim 8, wherein the reinforcing grating has a thickness that increases as distance from the leading edge increases.

* * * * *